United States Patent
Laconic et al.

(10) Patent No.: US 11,770,388 B1
(45) Date of Patent: Sep. 26, 2023

(54) NETWORK INFRASTRUCTURE DETECTION

(71) Applicant: Target Brands, Inc., Minneapolis, MN (US)

(72) Inventors: Breanna Laconic, Minneapolis, MN (US); Alex Foster, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 843 days.

(21) Appl. No.: 16/707,639

(22) Filed: Dec. 9, 2019

(51) Int. Cl.
*H04L 9/40* (2022.01)
*H04L 61/3015* (2022.01)
*H04L 45/00* (2022.01)
*H04L 67/12* (2022.01)
*H04L 101/37* (2022.01)

(52) U.S. Cl.
CPC .......... *H04L 63/1416* (2013.01); *H04L 45/72* (2013.01); *H04L 61/3025* (2013.01); *H04L 63/20* (2013.01); *H04L 67/12* (2013.01); *H04L 2101/37* (2022.05)

(58) Field of Classification Search
CPC . H04L 63/1416; H04L 45/72; H04L 61/3025; H04L 61/307; H04L 63/20; H04L 67/12; H04L 61/3015
See application file for complete search history.

(56) References Cited

U.S. PATENT DOCUMENTS

| 8,250,654 B1* | 8/2012 | Kennedy | H04L 43/0817 713/188 |
| 8,549,609 B2 | 10/2013 | Horman et al. | |
| 8,621,556 B1 | 12/2013 | Bharali et al. | |
| 10,831,883 B1* | 11/2020 | Pawar | G06F 21/554 |
| 11,303,670 B1* | 4/2022 | Wueest | H04L 63/145 |
| 2001/0023459 A1 | 9/2001 | Asami | |
| 2005/0050146 A1* | 3/2005 | Jani | G06Q 10/10 709/206 |
| 2005/0262566 A1* | 11/2005 | Gassoway | G06F 21/564 713/188 |
| 2007/0067397 A1* | 3/2007 | Tran | G06Q 10/107 709/206 |
| 2010/0132009 A1 | 5/2010 | Khemani et al. | |
| 2010/0138910 A1 | 6/2010 | Aldor et al. | |

(Continued)

OTHER PUBLICATIONS

G.J. Pottie and W.J. Kaiser, "Wireless Integrated Network Sensors," 2000, pp. 51-58 (Year: 2000).*

(Continued)

*Primary Examiner* — Luu T Pham
*Assistant Examiner* — Canh Le
(74) *Attorney, Agent, or Firm* — Barnes & Thornburg LLP

(57) ABSTRACT

Network infrastructure can be automatically detected. A network sensor detects a new network message. A source-address of the new network message is extracted. A plurality of addresses are assembled based on the source-address. These are recursed, using each of the unique similar-addresses as current addresses. Metadata is assembled for each of the addresses in the plurality of addresses. For each particular address in the plurality of addresses, a risk-label is assigned out of a plurality of possible risk-labels, by weighing a plurality of factors; and performing a network security action with the risk-label.

18 Claims, 8 Drawing Sheets

(56) References Cited

U.S. PATENT DOCUMENTS

| | | | |
|---|---|---|---|
| 2016/0191549 A1* | 6/2016 | Nguyen | G06F 11/3006 |
| | | | 726/23 |
| 2016/0212159 A1* | 7/2016 | Gupta | G06F 21/54 |
| 2016/0285914 A1* | 9/2016 | Singh | H04L 63/1416 |
| 2017/0195352 A1* | 7/2017 | Yishay | H04L 63/145 |
| 2017/0250989 A1* | 8/2017 | Bhattacharya | H04L 63/101 |
| 2019/0387005 A1* | 12/2019 | Zawoad | H04L 63/1408 |

OTHER PUBLICATIONS

Sutharshan Rajasegarar et al., "Anomaly detection in wireless sensor networks," 2008, pp. 34-40 (Year: 2008).*

* cited by examiner

NETWORK INFRASTRUCTURE DETECTION

TECHNICAL FIELD

This document generally relates to automatic detection of network infrastructure, including network infrastructure used for malicious purposes.

BACKGROUND

Network security includes policies, practices, and devices adapted to monitor and prevent unwanted access, misuse, modification, or attacks on computer networks and network-accessible resources. Network security involves differentiating and restricting between authorized and unauthorized access to data and services in a network, which can be controlled by one or more authentication schemes. Malicious actors are users that are not authorized to access the network (or particular data and resources of the network) but who nevertheless attempt to circumvent the network's implemented security controls in order to gain access to the network, either by thwarting network security measures or circumventing them by, for example, getting an authorized user to unwittingly perform actions that provide malicious actors with access. For example, malicious actors may either directly attempt to thwart network security measures, such as through an arbitrary execution exploit, or indirectly attempt to gain access through an authorized user, such as through a phishing scheme.

Network security can include proactive and reactive security measures that either block security threats before they exploit a security vulnerability, or the security measures are deployed once the vulnerability has been exploited to mitigate the exploit. Such proactive and reactive security measures can be performed automatically and/or manually, such as by security analysts who are experts in identifying and eliminating security threats in a network. Security analysts can perform a variety of tasks, such as investigating potential security vulnerabilities and instances of potential malicious attacks, differentiating between benign and malicious network activity, and formulating response strategies when malicious attacks are found.

SUMMARY

This document generally describes technology that can automatically track malicious network infrastructure and related data, such as domains, IP addresses, email addresses, name servers, and other network infrastructure that can identify the source of network traffic. For example, sources of malicious network traffic can change frequently, such as the servers that host malicious network sites can change from one IP address to another IP address, even though the underlying malicious network traffic (e.g., malicious email traffic, attempts to breach network security safeguards) can be more or less the same. This technology can leverage known malicious network infrastructure to determine whether unknown network infrastructure is malicious or benign, which can aid in blocking malicious network traffic earlier and more effectively.

This technology can examine relationships among network infrastructure and, if a relationship is identified with a known malicious entity, then the network infrastructure that is being evaluated is determined to likely also be malicious. The system can maintain a record of network infrastructure relationships, both based on observed relationships by internal network monitors and identified relationships from various threat intelligence services. The output from the system can be a blacklist of network infrastructure that has been identified as malicious or likely malicious. This blacklist has many uses, such as part of its IoC check to quickly and efficiently identify network traffic provided by network sensors as malicious.

To determine whether unknown network infrastructure is malicious, the system can automatically generate a set of metadata that identifies network infrastructure associated with network traffic, such as the IP address, the server, the domain name, and registrant or sender information (e.g., email address), and can then proceed to investigate whether relationships exist between the network traffic and known malicious infrastructure. The investigation can include pivoting across different dimensions of network infrastructure identifiers to automatically identify potential relationships with malicious infrastructure. From these evaluations, signatures can be generated that define likely-malicious communication. Network security devices can then allow or deny communications, depending on if the communication matches a signature.

In some implementations, a method is used for automatic detection of network infrastructure. The method includes receiving, by a network sensor, a new network message. The method includes extracting a source-address of the new network message; assembling a plurality of addresses based on the source-address The method includes recursing, using each of the unique similar-addresses as current addresses. The method includes assembling metadata each of the addresses in the plurality of addresses. Assigning, for each particular address in the plurality of addresses, a risk-label out of a plurality of possible risk-labels, by weighing a plurality of factors; and performing a network security action with the risk-label.

Implementations can include some, none, or all of the following features. Assembling a plurality of addresses based on the source-address comprises recursively assembling a plurality of addresses based on the source-address, starting with the source-address as a current-address, by: assembling, from at least one of the current-address and the current-metadata, a list of similar-addresses by finding addresses that are different than the current-address but shares at least one property with the current-address; identifying which of the similar-addresses are unique by determining which of the similar-addresses have not yet been treated as a current-address in the recursive assembly; and recursing, using each of the unique similar-addresses as current addresses. The metadata includes at least one of the group consisting of domain-name, nameserver, and registrant-email. The metadata includes each of domain-name, nameserver, and registrant-email. The pool of possible risk-labels including a safe-label indicating no unsafe behavior was found associated with the address, a tainted-label indicating the address was found to be associated with network architecture identified as malicious. The plurality of factors includes a first factor comprising a comparison between a number of domains associated with the particular address's registrant-email is greater and a first threshold value, wherein the number of domains associated with the particular address's registrant-email being less than the first threshold value indicates a likelihood of unsafe behavior being associated with the particular address. The plurality of factors includes a second factor comprising a determination that the particular address's registrant-email was previously identified as tainted. The plurality of factors includes a third factor comprising a comparison between 1) a number of domains registered with an organization owning the particular address and 2) a number of domain registered by the particular address, wherein an exact match indicates a likelihood of unsafe behavior being associated with the particular address. The plurality of factors includes a fourth factor comprising a comparison between the number of domains registered with an organization owning the particular address and a second threshold value, wherein the number of domains registered with an organization owning the particular address indicates being less than the second threshold value indicates a likelihood of unsafe behavior being associated with the particular address. The plurality of factors includes a fifth factor comprising a comparison between a number of websites hosted on a server that hosts a resource addressed by the particular address and a third threshold value, where the number of websites hosted on the server that hosts the resource addressed by the particular address being less than the threshold value indicates a likelihood of unsafe behavior being associated with the particular address.

The systems, devices, program products, and processes described throughout this document can, in some instances, provide one or more of the following advantages. Network security is improved. For example, new malicious network architecture can be rapidly identified. Malicious actors have been known to set up and tear down network architecture to evade notice from their potential victims. This technology can operate continuously and automatically to provide alerts or potential alerts ready for human attention. This technology can operate without direct user input. Malicious actors have been known to exploit time-zone-differences and holiday/weekend schedules to launch attacks when their victims are expected to be away from their network security tools. By operating at full effect in these times, greater network security can be provided.

DESCRIPTION OF DRAWINGS

Like reference symbols in the various drawings indicate like elements

DETAILED DESCRIPTION

Networked devices can be configured to automatically identify external network infrastructure that is likely controlled by malicious actors. For example, a large enterprise network sends and receives many, many network communications from many, many external addresses. In order to defend the network from malicious communications (e.g., the delivery of malware, the exfiltration of sensitive information), the network can be configured with a variety of security features such as blacklists of known-bad addresses or files, behavioral analysis of client machines, ingestion of third-party security information like virus signatures, etc.

However, these malicious actors constantly change the network infrastructure from which they perform their attacks. In order to constantly identify this network architecture, technology described in this document can identify patterns in malicious network communications in order to identify the infrastructure (e.g., servers, domain names, Internet Protocol (IP) addresses). As the malicious actors continually tear down infrastructure known to be used for malicious purposes while also continually setting up new infrastructure, this technology can continually refresh the identification of this infrastructure.

In order to perform this identification, a network can monitor incoming and outgoing communications. When a new address is seen or identified as of interest, metadata about the message can be gathered. Then, the analysis can pivot one or more times on that metadata, which includes looking for records of historic messages that share a particular metadata value (e.g., same IP address, same registrant email). The original message and other messages found via the pivot can be collected, and subjected to group of tests (e.g., thresholds, filters, rules) that, depending on the results of the test, indicate that infrastructure related to the new message may or may not be used by malicious actors.

Figure 1A:
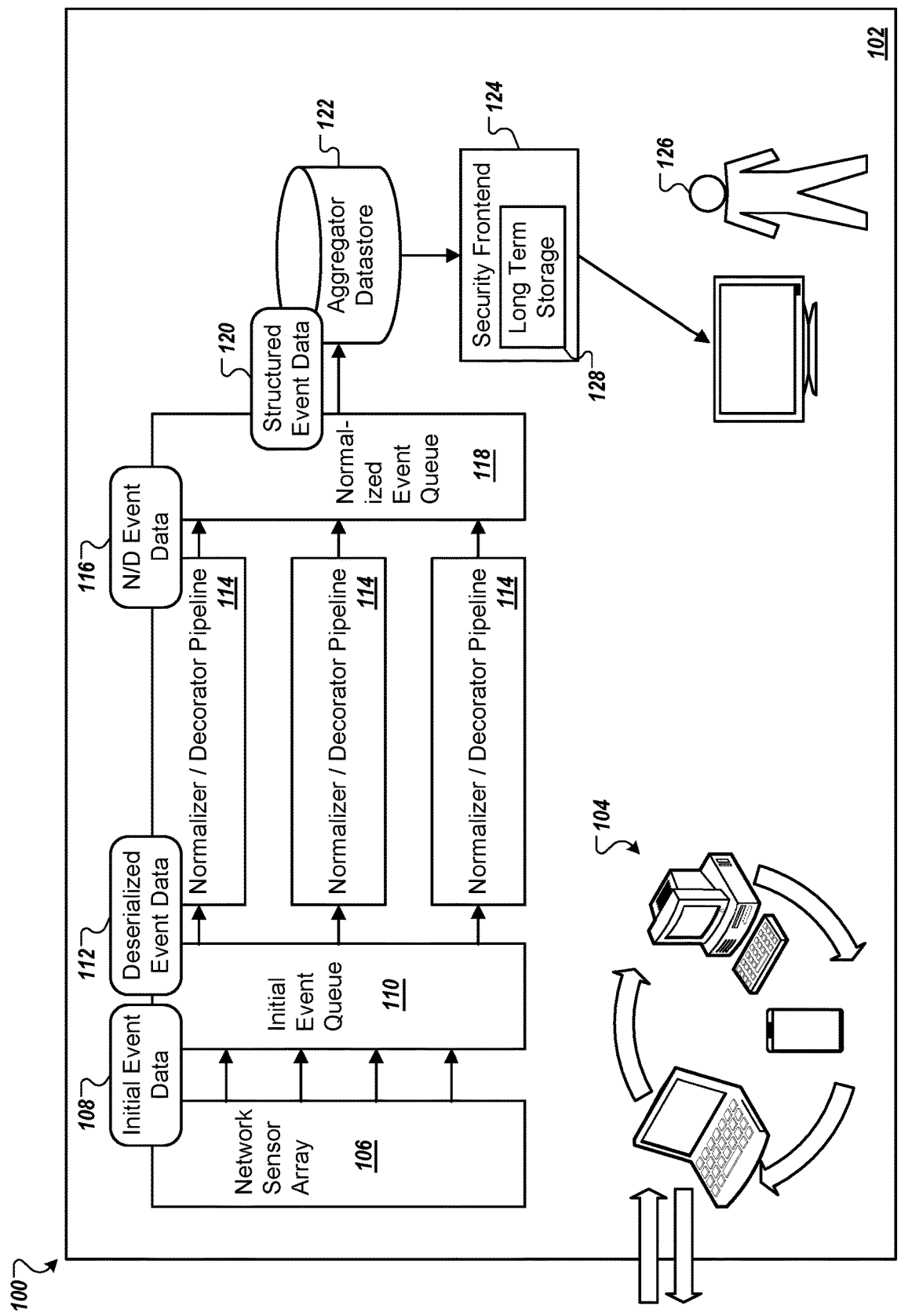
FIGS. 1A and 1B are block diagrams of an example system for generating events in response to network activity.

FIG. 1A is a block diagram of an example system 100 for generating events in response to network activity. In the system 100, a network 102 is being protected by one or more security analysts. The security analysts are users that are tasked with monitoring the security state of the network 102 and to prevent malicious activity like malware execution, data exfiltration, etc.

The network 102 is, for example, a local network, intranet, virtual private network, or other data network used by an organization. The network 102 can include networking hardware such as cables, wireless access points, routers, gateways, firewalls, etc., that work together to allow resident machines 104 to communicate with other resident machines 104 and with computing resources outside of the network 102. The resident machines 104 can include, but are not limited to, personal computers, servers, and mobile devices.

Operations of the network 102 and resident machines 104 may come under attack from malicious actors—users and/or automated services that seek to exploit computing resources they do not own or have authorization to use. The system 100 can be configured to provide monitoring functionality that generates data based on the activity on the network— including malicious activity. This monitoring can then be provided to a security analysts that is tasked with stopping or attempt to stop these attacks through various types of security responses.

When the resident machines 104 participate in data transmission on the network 102, an array of network security sensors 106 can sense the network activity and generate data for one or more events that represent the activity. For example, the sensors 106 can be connected to the physical layer of the network (e.g., wires, wireless data transmissions) and be configured to respond when signals indicate that network activity is happening. The sensors can respond to this sensing by creating data even when the sensed activity is not addressed to or involve the sensors 106. Depending on the size and scale of the network 102, one array of network sensors 106 may have more or fewer sensors than another array of network sensors. In various examples, hundreds, thousands, tens of thousands, or hundreds of thousands of sensors can be used, although more or fewer are possible.

The sensors can provide the initial event data 108 to one or more initial event queues 110. The initial event data 108 may include data objects that do not conform to any single format or structure, may be out of chronological order, and may otherwise be non-homogeneous. The initial event queues 110 can receive the initial event data 108 and deserialize the data objects of the initial event data 108 into deserialized event data 112. The deserialized event data can include all or part of the data included in the initial event data 108, and has been deserialized. In general, serialization of data involves the transforming or reconfiguring of data so that it can be stored, transmitted, etc. For example, the serialization process performed by the initial event queues 110 can include padding out short data strings or removing redundant data, decompressing compressed data, changing the format, etc.

One or more normalizer/decorator pipelines 114 can receive the deserialized event data 112 from the initial event queues 110 and process the deserialized event data 112 into normalized/decorated event data 116. For example, the normalizer/decorator pipelines 114 can normalize the deserialized event data 112 by editing its structure so that the structure complies with one or more standards, and the normalizer/decorator pipelines 114 can decorate the deserialized event data 112 by adding data to the events from other sources (e.g., timestamps, geo-location data, threat intelligence data, a connection-identifier.)

The number of normalizer/decorator pipelines 114 can change depending on the load of the initial event queues 110. For example, new instances of normalizer/decorator pipelines 114 can be generated and used when a backlog of deserialized event data 112 is prepared by the initial event queue 110, and these normalizer/decorator pipelines 114 can be released and idle when the backlog falls under a threshold size, is empty, begins trending downward, etc.

In some cases, the ramp-up of the normalizer/decorator pipelines 114 can be more sensitive than the ramp-down. That is, a particular growth in backlog may cause more normalizer/decorator pipelines 114 to be instantiated faster than a similar reduction in backlog. This may be accomplished, for example, by adding N normalizer/decorator pipelines 114 every second a backlog is seen, and removing only M normalizer/decorator pipelines 114 every second the backlog is not seen, where N is greater than M (e.g., N=4; M=1.)

The system 100 can be configured to use the normalizer/decorator pipeline 114 to efficiently make matches and append flags to data. One such type of flag is an Indicator of Compromise (IoC) that record information a compromise. By appending the IoC with the normalizer/decorator pipeline 114, later elements such as the security frontend 124 may be executed with less resources than would otherwise be needed. For example, the normalizer/decorator pipeline 114 can be configured to match in-network activity to lists of known malicious indicators. This includes hashes (MD5, SHA1 SHA256) of a known-malicious file (e.g. a document with a script containing malicious activity) or an IP address of an endpoint in a network communication. This configuration can tie IoCs to related data early in the process, removing a need to keep tables mapping network activity to IoCs for use later in the pipeline.

An aggregator datastore 122 can collect the structured event data 120 and store the structured event data 120 in an indexable and searchable datastore 122. The aggregator datastore 122 may store all of the structured event data 120 until the aggregator datastore 122 is full or otherwise storing at least a threshold amount of data or data older than a threshold period of time. When this volume or age of data is reached, the oldest data may be discarded, making room for new data. That is, the aggregator datastore 122 may operate as a rolling buffer that provides storage for the news data, discarding the old data. Other storage systems (not shown here for clarity) can be used for long-term or archival storage, which may provide less expensive storage that is slower to respond to queries.

A security front-end 124 can provide a graphical user interface (GUI) to a computer and/or other devices used by a security analyst 126. The GUI can provide the security analyst 126 with access to the structured event data 120 that is stored in the aggregator datastore 122 in a way that allows the security analyst 126 to understand and more quickly investigate security events of the network 102 that may or may not be malicious. For example, the GUI can provide the security analyst 126 with tools to draft queries, test the queries on the structured event data 120, and then store the same query for use as a rule on future events that are collected from the network 102.

In addition, the security frontend 124 can execute one or more rules on the incoming structured event data 120. These rules may contain conditional statements that, if ever found true on incoming event data, trigger response statements. These response statements can include instructions for automated responses (e.g., quarantining a device on the network 102, subjecting a data connection to enhanced analysis) as well as alerts to communicate the fact that a rule was triggered. These alerts may be transmitted to users via one or more channels that include email, text message, and the generation of a ticket in a ticketing system.

The use of the structure of the system 100 allows for efficient generation of alerts and processing of network events. For example, as shown here, both normalization and decoration of event data with IoCs can be performed as part of the ingestion of the network data instead of later once event data objects are created and ingested into storage. By using this type of architecture and performing decoration at the time of ingestion, the computing resources needed for decoration can be reduced. As done here, decoration with IoCs can be as simple as maintaining a dictionary of key:value pairs for various fields, and as the normalizer/decorator pipeline 114 normalizes the event data, the event data value can be run through the dictionary.

Any hits in the dictionary, where a field of the event data object matches a key entry, can result in the copying of the key:value pair to the event data object. As will be understood, this can be implemented in a very efficient and thus fast-to-process format that scales slowly as the number of events grows and as the size of the dictionary grows. By way of comparison, decorating events after they already are stored in a datastore can involve far more complex Boolean operations, repetitive traversals, etc. that have the result of becoming less performant as the number of events or size of the dictionary grows.

In this way, extensive and fine-grain event generation, storage, and analysis can be created with this system 100. In one example, an enterprise data network that connects hundreds of physical locations and millions of devices can be effectively and efficiently monitored. In this example, tens of thousands sensors 106 can produce tens of thousands of events a day (including hundreds of thousands of events a second). The system 100 can be created using hardware resources that may be well within an enterprise of this size and scope, and provide access to events in the aggregator datastore 122 within seconds of the event occurring on the network. Further, the rules may be run on the events every minute or every handful of minutes.

Further, the use of a rolling buffer in the aggregator datastore 122 can ensure that the most relevant events—the newest ones—are always available for analysis. In the above example, a week's worth of events can be stored in the rolling buffer. Some indexing can be built on the entire week's worth of data, with enhanced indexing being built on the newest data. In this way, rules to identify potentially malicious activity can be run on the newest data at high speed and efficiency, without requiring re-indexing of all data.

Figure 1B:
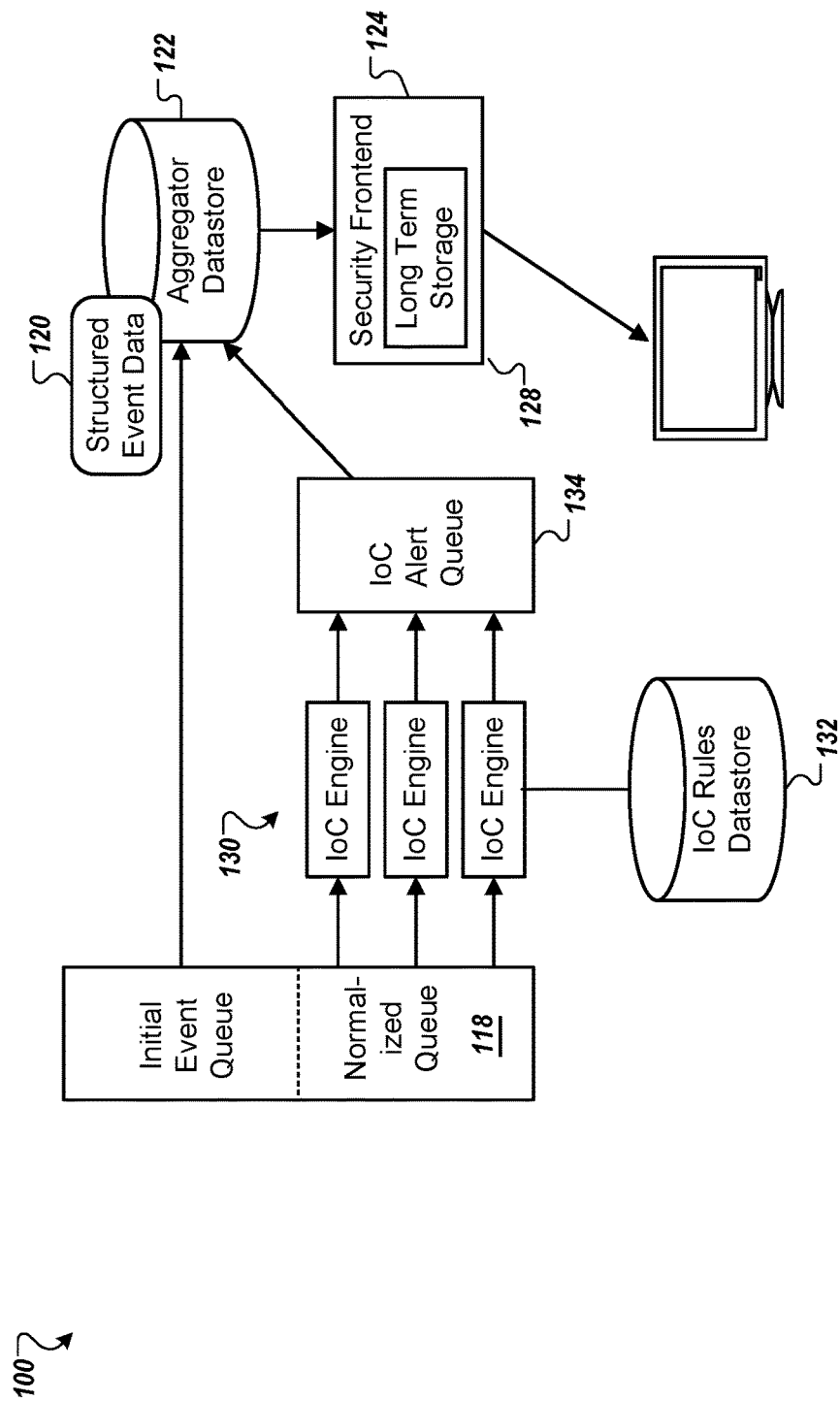

FIG. 1B is a block diagram of optional elements of the system 100. As shown here, the normalized event queue 118 can include one or more normalized queues from which network event data can be provided to the IoC engines 130 for processing against IoC rules. The IoC engines 130 can receive network event data, along with other pertinent data to the event data, such as additional information added to the network event data in the normalizer/decorator pipelines 114. The IoC engines 130 can access one or more IoC rules from the IoC rules datastore 132 and compare the normalized event data 116 against these rules. If a normalized event data 116 matches an IoC rule, the event data can be decorated with information about the IoC rule, such as a flag or code associated with the matching rule being added to the event data that indicates the implications of the match (e.g., domain for network event is known bad/malicious domain, etc.). These decorated events can be provided to the aggregator datastore 122 for processing against the more computationally intensive rules.

The rules in the IoC rules datastore 132 can include one or more rules that are easy to process (i.e. require few computational resources to run) relative to the rules run against the aggregator datastore 122. Bifurcating processing of the more computationally simple IoC rules from the more complex rules run against the aggregator datastore 122 across different systems can create greater processing efficiency and use of processing resources. The IoC rules can include, for instance, simple pattern or string matching tests. For example, one test may be to compare an MD5 hash of an email attachment against a corpus of MD5 hashes from known-malicious historical email attachments. Since MD5 hashes are not truly unique and hash-collisions of different files are possible, this processing can provide a likely indicator of potentially malicious email traffic. However, because MD5 hashes are computationally simple, this test can be performed quickly and can provide an efficient determination of potentially malicious events.

The IoC engine deposits the structured event data 120 into an IoC alert queue. The IoC alert queue can collect the received structured event data 120 for storage in the aggregator datastore 122.

Figure 2:
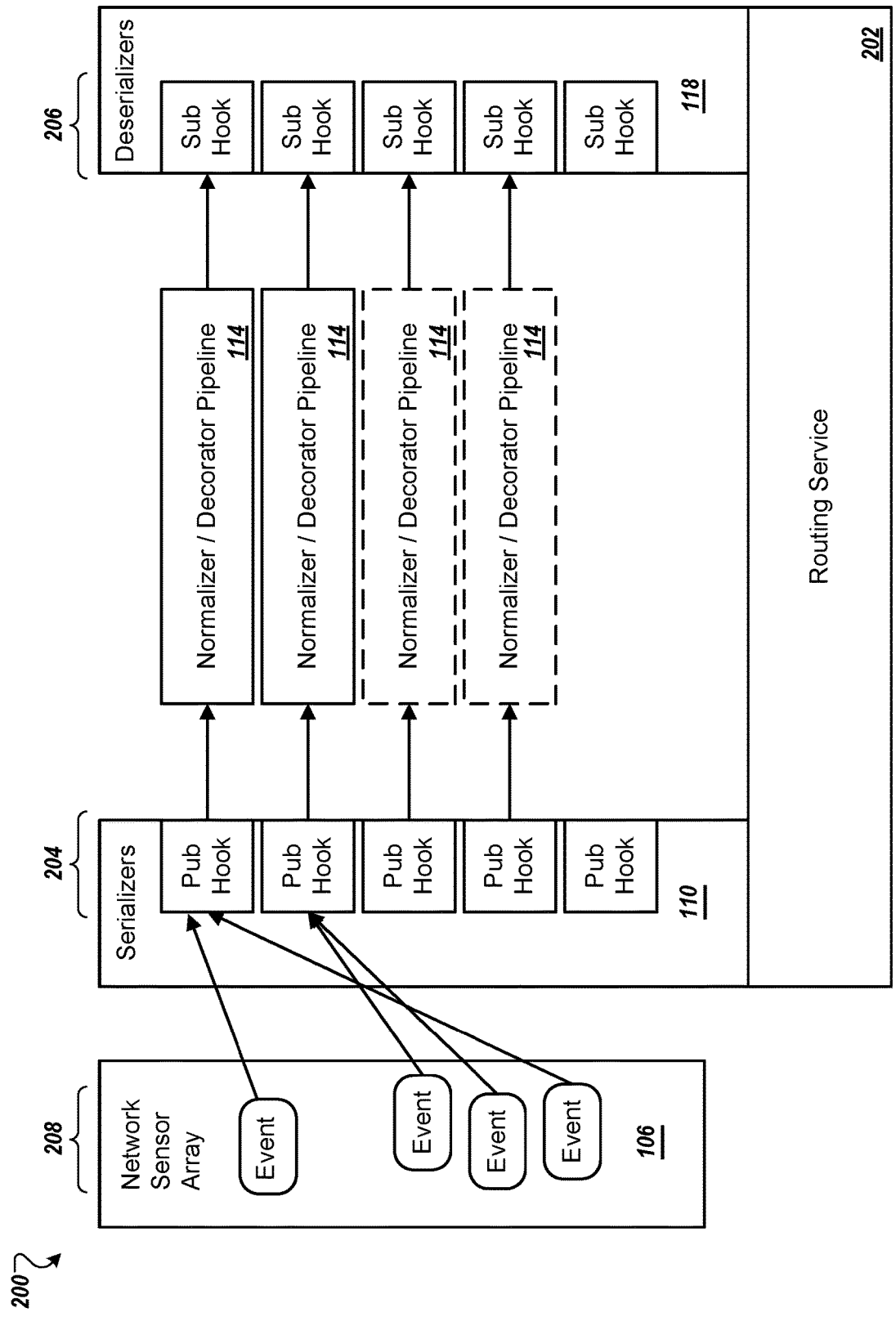
FIG. 2 is a block diagram of an example system for normalizing and decorating event data.

FIG. 2 is a block diagram of an example system 200 for normalizing and decorating event data. The system 200 shows, in greater detail, one possible configuration of some of the components of the system 100 for generation, normalization, and decoration of the event data in the system 100. However, other configurations of the elements of system 100 are possible.

In the network sensor array 106, sensors of many different types, in many different locations are positioned in the network 102. Different sensors 106 can generate events of different types. For example, a sensor 106 in an edge device such as a gateway or firewall can generate events when connections are created between resident machines 104 and machines outside of the network 102. A sensor 106 in a file-server can be configured to generate events when a resident machine 104 accesses any file, accesses a file in a restricted directory, succeeds in an authentication attempt, fails in an authentication attempt, etc.

The events can be routed to one of the initial event queues 110. As shown in this example, the initial event queues 110 and the normalized event queue 118 are both elements of or controlled by a routing service 202. The routing service can provide generalized data publication, data subscription, data queuing, and data transmission services. The routing service 202 can instantiate publication hooks 204 of the initial event queues 110 and can instantiate the subscription hooks 206 of the normalized event queue 118.

The routing service 202 can route events 208 from the network sensor array 106 to the publication hooks 204. The routing service may route the events 208 based on one or more properties of the events 208. For example, each publication hook may be associated with one or more event types. In such a case, the routing service 202 can examine each event 208 and route the event 208 to the publication hook of the associated type.

In cases when there are more events routed to a publication hook 204 than the throughput of the publication hook 204, which may be based on the speed of the normalizer/decorator pipeline 114, the routing service 202 can queue waiting events 208 and dequeuer them into the publication hook 204 in order. This order may be a first-in-first-out configuration, or it could be a priority queue that dequeues the highest priority event 208 first, etc.

The routing service 202 can monitor the state of the queues to the publication hooks 204 and adjust the number of normalizer/decorator pipelines 114. For example, to avoid too much backlog, additional normalizer/decorator pipelines 114 can be created when the backlog reaches a certain size (in data size, in length of time, etc.) When the backlog falls, the routing service 202 can reduce the number of normalizer/decorator pipelines 114.

Figure 3:
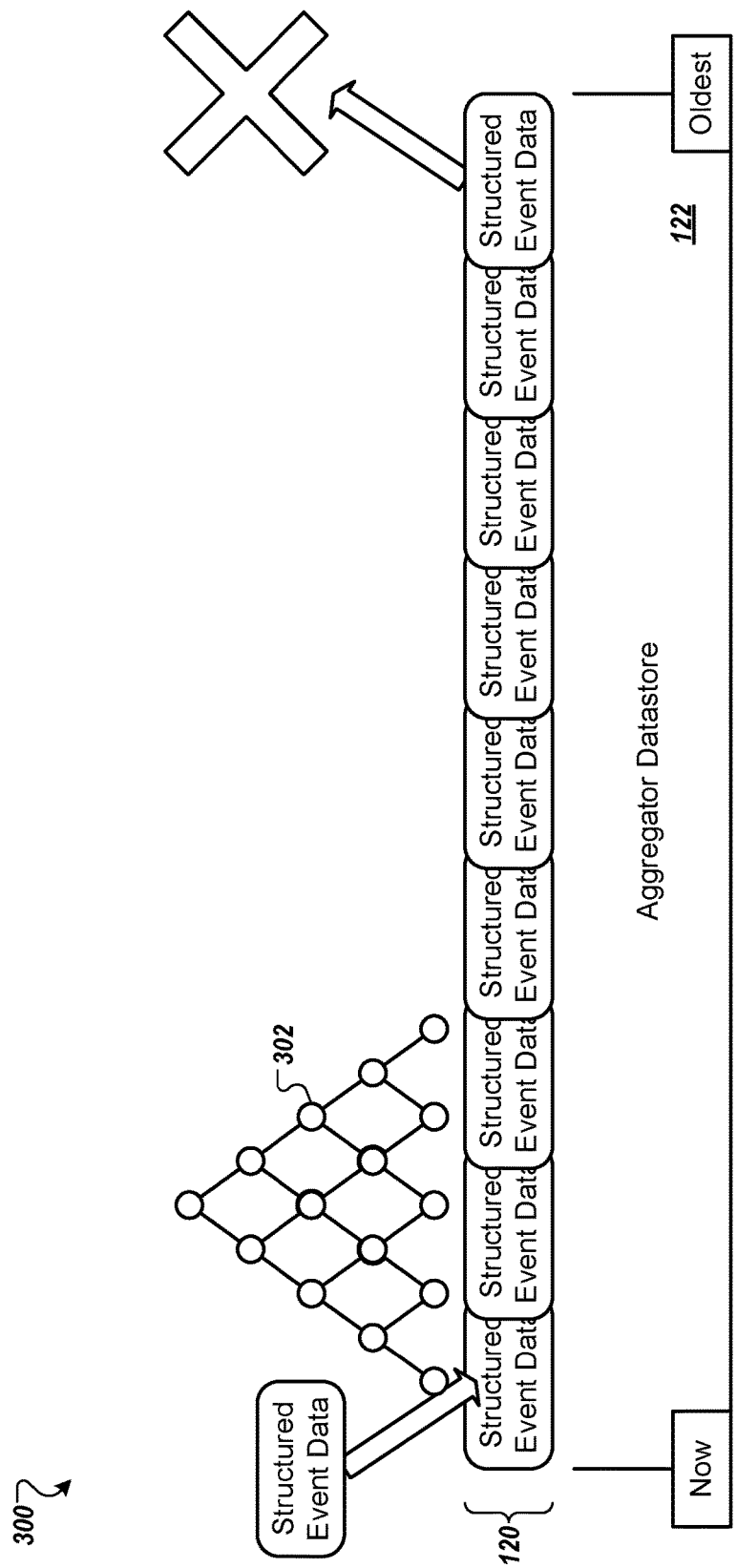
FIG. 3 is a block diagram of an example system for storage of event data.

FIG. 3 is a block diagram of an example system 300 for storage of event data. The system 300 shows, in greater detail, one possible configuration of some of the components of the system 100 for storing event data of the system 100. However, other configurations of the elements of system 100 are possible.

In the aggregator datastore 122, structured event data 120 is stored. Each structured event data 120 can include timing data such as a time that the event occurred in the network 102, a time that the structured event data 120 was finalized or stored, etc. The structured event data 120 is shown here ordered according to some time element, from newest (on the left as shown) to the oldest (as shown). Depending on the hardware configuration of the aggregator datastore 122, this ordering may or may not represent the way that the structured event data 120 is stored on disk. That is to say, the aggregator data may function as a true rolling buffer, where a circular array of memory locations are allocated for this purpose, and an index traverses the circular array when a write operation is performed.

In other configurations, the structured event data 122 is stored according to a different, and potentially more complex, scheme. This may be preferable, for example, to allow for multiple hardware instances or a distributed disk system, redundancy, improved geographic diversity, or a more flexible disk layout. In such cases, the ordered organization of the structured event data 120 is a logical view of the aggregator datastore 122.

When new structured event data 120 is added to the aggregator datastore 122, the aggregator datastore 122 can add the new structured event data 120 until the aggregator datastore 122 is full. When the aggregator datastore 122 is full, the aggregator datastore 122 can bump the oldest structured event data 120 out to make room for the new structured event data 120.

The aggregator datastore 122 can build an index 302 on recent structured event data 120. For example, the index 302 may be built on the N most recent data object, or on M MB of the most recent structured event data 120, or on all structured event data 120 less than a threshold age.

Figure 4:
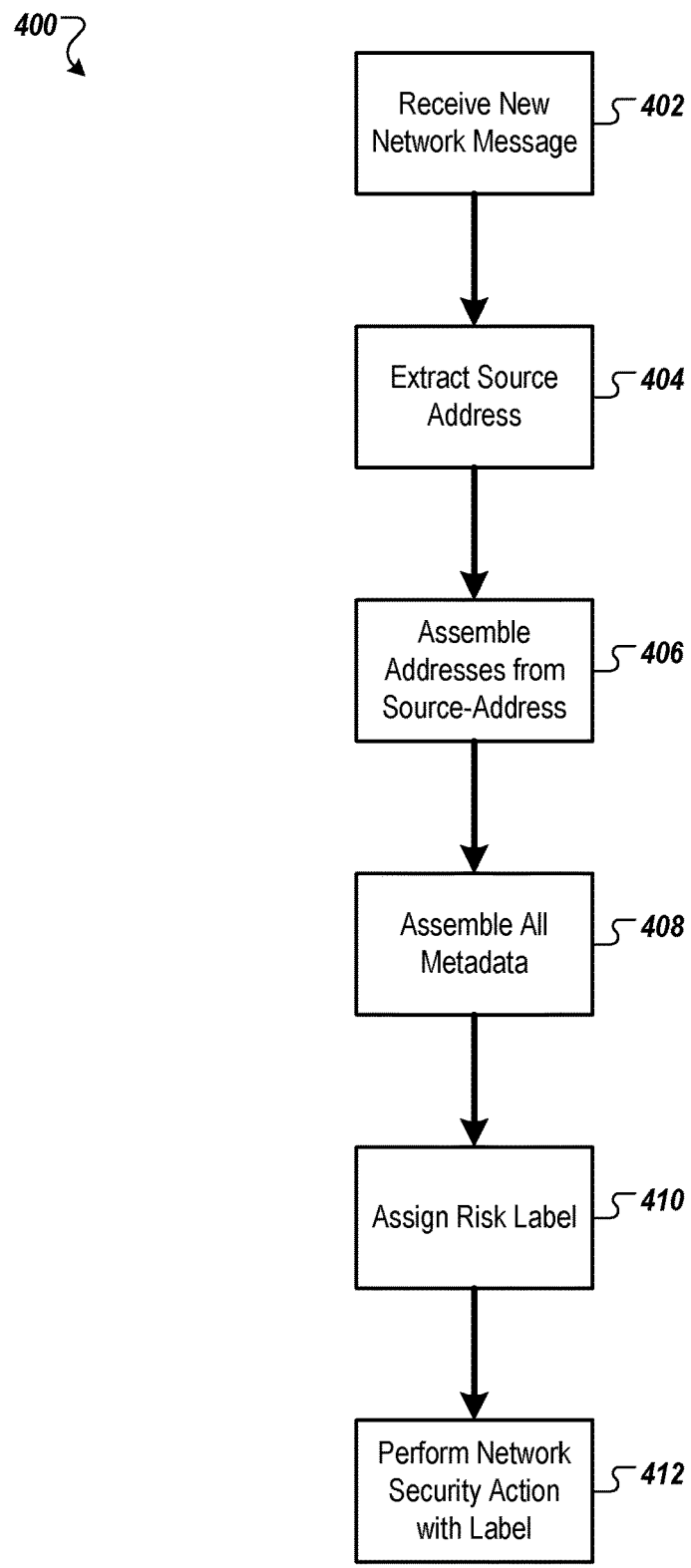
FIG. 4 is a flowchart of an example process for assigning risk-labels to network infrastructure.

FIG. 4 is a flowchart of an example process 400 for assigning risk-labels to network infrastructure. The process 400 can be performed by, for example, the systems 100 and/or 200. In the process 400, a particular number and order of operations are described. However, it will be appreciated that other numbers and/or orders of operations are possible to perform the same or a similar result. This process may be performed in real time, or it may be performed later with data stored in computer memory.

A new network message is received 402. For example, in the network 100, as network traffic is received and sent by the resident machines A source-address is extracted from the new network message 404. For example, sensors in the array of network sensors 106 can sense the messages as the messages traverse the network 100 and/or as the messages pass through the boundary of the network 100. It will be appreciated that, even though the system 100 has not labeled the messages with a risk-label, some of these messages may in fact be from malicious actors.

A plurality of addresses are assembled based on the source-address 406. For example, the system 100 can process a new message through the initial event queue 110, the normalizer/decorator pipeline 114, and normalizer event queue to store structured data 120 about the message in the aggregator datastore 122. A process in the aggregator datastore 122 can monitor or listen for new structured event data 120 (see FIG. 3), and when a new structured event data 120 is found, the source address may be extracted. This source address may be an IP address, a Universal Resource Identifier (URI), or similar address.

Metadata is assembled for the addresses 408. For example, the process can marshal metadata of the new message for analysis. Additionally, metadata for related messages may be marshaled as well. One example process for marshalling this metadata is described with respect to FIG. 5 below, though other processes are possible.

Risk labels are assigned to each of the addresses 410. For example, using the marshaled metadata, a risk-tag out of a pre-prepared pool of possible risk tags can be assigned to the source-address of the new message and/or to some or all of the related messages. For example, based on the analysis of the marshalled metadata, the source message and all other messages from the same IP address may be tagged with either a safe-label indicating that no unsafe behavior was found associated with the addresses, or with a tainted-label indicating that the address was found to be associated with network architecture identified as malicious.

Network security actions are performed using the risk-labels 412. For example, the network 100 can, responsive to the tagging, generate alerts related to this activity, block all network communication tainted-label sources, quarantine such messages for enhanced scrutiny, log extra metadata, enrich other stored data with the tagging information, etc.

Consider an example in which a new server system is brought online with a new set of IP addresses that are all associated with new URI's in a domain. From this new architecture, the controller of the architecture begins sending out malware in the hopes of successfully invading networks, including the network 100, before the architecture is identified as malicious by all the potential target networks.

The new architecture can send a series of messages to the resident machines 104. The network sensor array 106 can receive 402 the messages, and this example will follow the sensing of the fourth such message.

The IP address of the new message can be extracted 404 by reading the data field of the structured event data 120 for the new message. From this IP address, a search 406 of the aggregator datastore 122 can be performed to identify the structured event data 120 for the three previous messages from the same IP address. In addition, one 'hop' is performed 406 and all structured event data 120 having the same registrar-email as the new message is searched for. From this second search, two messages are unique—that is they were not included in the three previous messages from the same IP address. This produces a collection of six total messages: the new message, three found with the same IP address, and two more unique messages having the same register-email.

Each of the six unique messages is assigned a risk-label out of a list of possible risk labels (e.g., safe, tainted, etc.) Thereafter, any messages from IP addresses of any of the messages marked with one of the labels (tainted) can be blocked by the network 100 at the perimeter of the network 100, thereby protecting the resident machines 104 and other elements of the network 100 from exposure to the malicious architecture.

Figure 5:
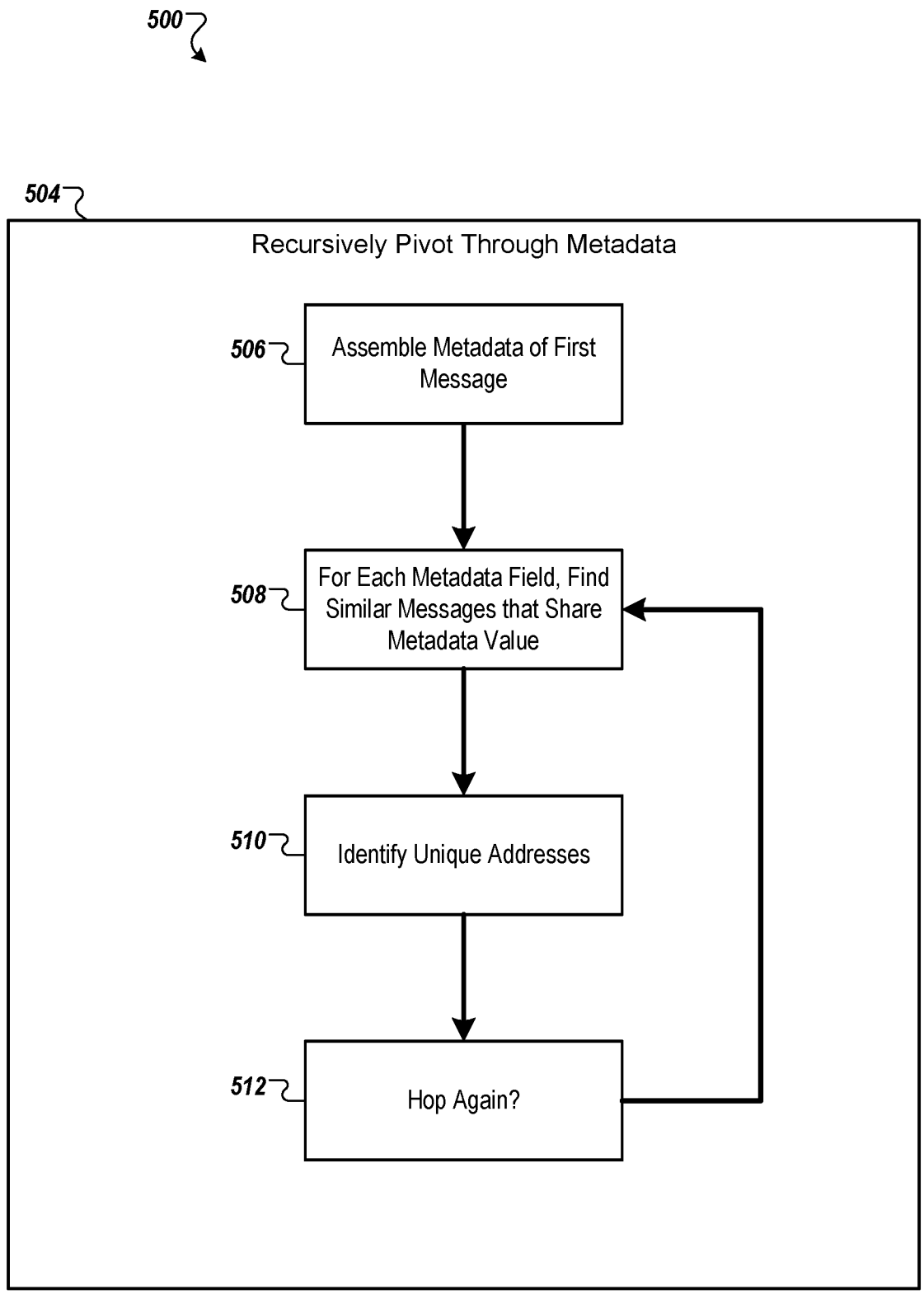
FIG. 5 is a flowchart of an example process for pivoting through metadata.

FIG. 5 is a flowchart of an example process 500 for pivoting through metadata. The process 500 can be performed by, for example, the systems 100 and/or 200. In the process 500, a particular number and order of operations are described. However, it will be appreciated that other numbers and/or orders of operations are possible to perform the same or a similar result. In some examples of the process 400, the process 500 can be used in the assembling of all metadata 408.

Metadata of the first messages is assembled 506. For example, the aggregator datastore 122 can search for structured event data 120 for the new message and extract metadata for the process 500. This metadata can include, but is not limited to, the source IP address, nameserver, email of registrant, and registrant listing data for the a newly received message.

For each metadata field, similar messages that share a metadata value are found 508. For example, the aggregator datastore 122 can search for other structured event data 120 that has the same data value in a particular data field. That is, for a new message with an email of registrant of "example@example.com", the aggregator datastore 122 can search for other structured event data 120 that also has the value "example@example.com" in the data field for email of registrant.

Unique addresses are identified 510. For example, in 508, some structured event data 120 may be found multiple times and/or different structured event data 120 that each have the same address may be found. In such a case, the aggregator datastore 122 can prune down the result list to only include a listing of unique address results. This can produce, for example, a collection of all messages within a single "hop" of the original message being analyzed no matter how, or how many times, it is connected to the original message in the aggregator datastore 122.

Further results may be found by performing another hop 512. For example, for each unique address in the result set, the process 500 can begin again using the new address (or, e.g., the structured event data 120) to search for additional unique addresses to add to the unique addressed begun in 510.

Figure 6:
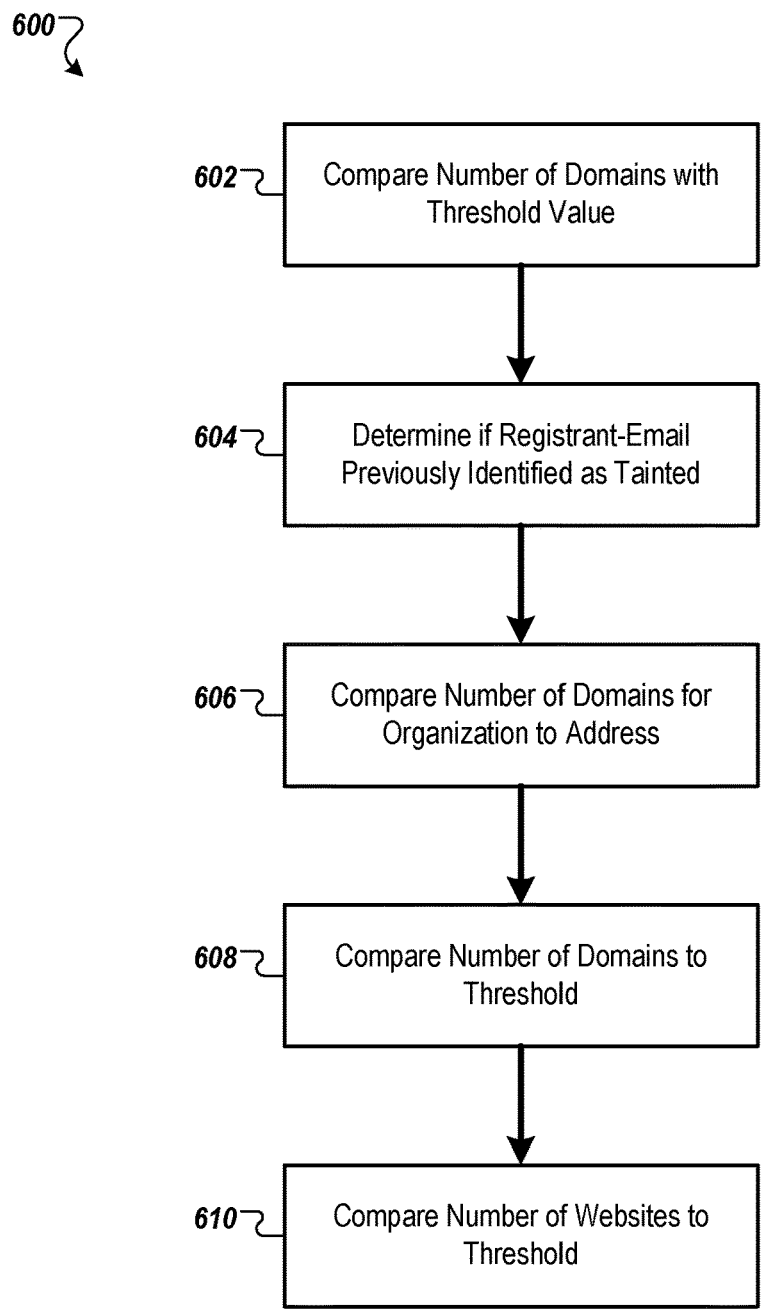
FIG. 6 is a flowchart of an example process for assigning a risk-label.

FIG. 6 is a flowchart of an example process 600 for assigning a risk-label. The process 600 can be performed by, for example, the system 100 and/or 200. In the process 600, a particular number and order of operations are described. However, it will be appreciated that other numbers and/or orders of operations are possible to perform the same or similar result. In some examples of the process 400, the process 600 can be used in the assigning of risk labels 410.

A number of domains is compared against a threshold value 602. For example, for each message or address being examined, the number of domains associated with the address's registrant-email is found. This number can be compared with a pre-determined threshold value (e.g., 4, 18, 250, 500, 799, 1000, 1125). If the number is less than the threshold value, this may indicate a likelihood of unsafe or malicious behavior associated with that message and a value tracking the behavior of the message can be updated to indicate unsafe likelihood. On the other hand, if the number is greater than the threshold value, the value tracking the behavior of the message can be updated to indicate safe likelihood.

A determination is made if the registrant email is previously identified as tainted 604. For example, the registrant email can be used to tie the current message to another messages associated with a person (or organization, etc.) by their control of the email. Then, if the email is so linked to a person with a history of malicious behavior, the current message can have the value tracking the behavior of the message updated to indicate unsafe behavior likelihood.

A comparison is made between the number of domains registered with an organization owning the particular address and the number of domains registered to the particular address of the message 606. For example, an exact match can be used as an indicator of unsafe behavior being associated with the particular address, and the value tracking behavior of the message can be updated to indicate an unsafe likelihood.

A comparison can be made between the number of domains registered with an organization owning the particular address and a second threshold value 608. For example, if the number of domains registered is less than a second threshold value (e.g., 4, 18, 250, 500, 799, 1000, 1125) this can be used as an indicator of unsafe behavior being associated with the particular address, and the value tracking behavior of the message can be updated to indicate an unsafe likelihood.

A comparison can be made between the number of websites hosted on a server that hosts a resource addressed by the address and a third threshold value 610. For example, if the number of hosted websites is less than a third threshold value (e.g., 4, 18, 250, 500, 799, 1000, 1125) this can be used as an indicator of unsafe behavior being associated with the particular address, and the value tracking behavior of the message can be updated to indicate an unsafe likelihood.

Figure 7:
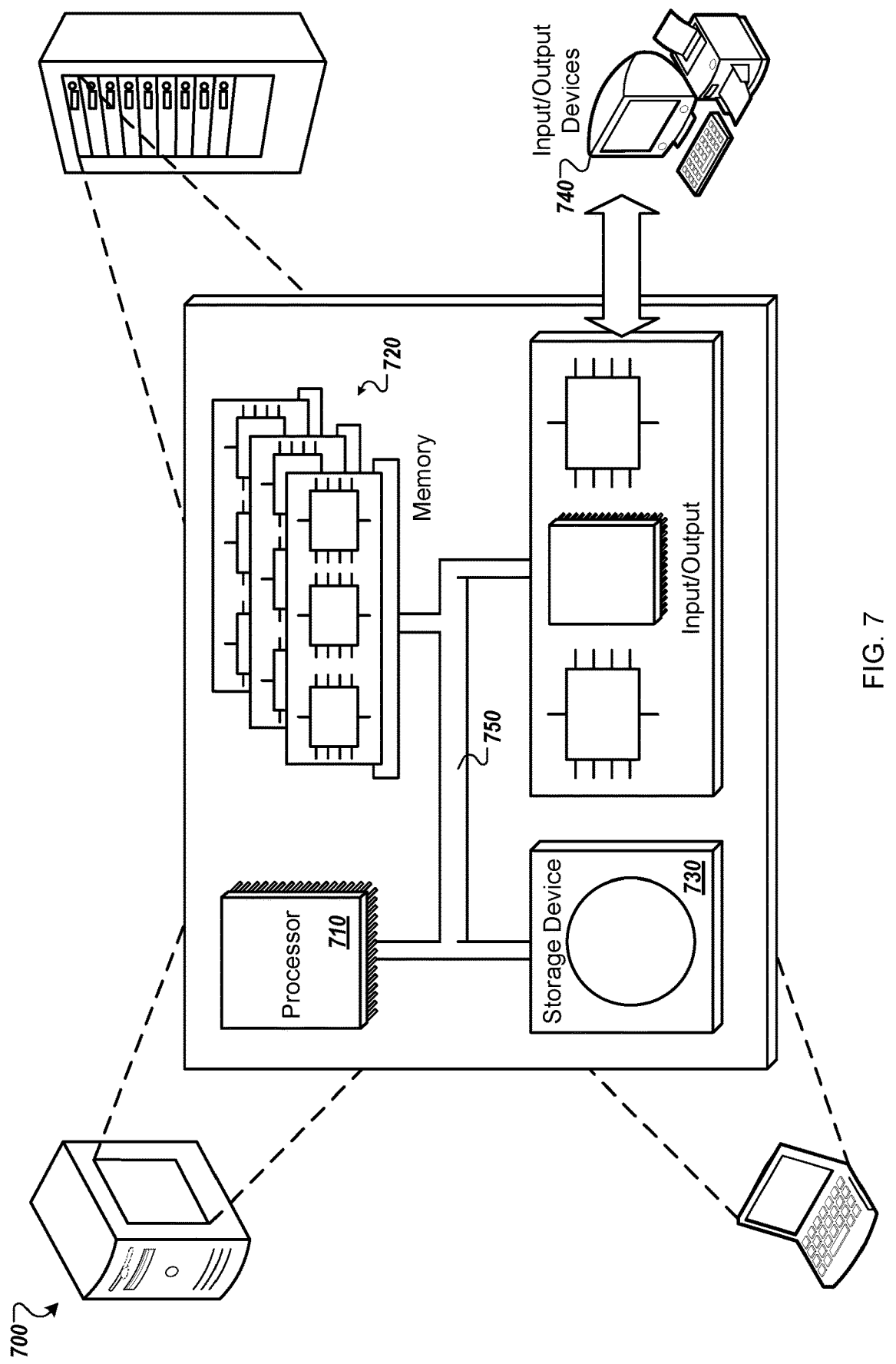
FIG. 7 is a schematic diagram that shows an example of a computing device and a mobile computing device.

FIG. 7 is a schematic diagram that shows an example of a computing system 700. The computing system 700 can be used for some or all of the operations described previously, according to some implementations. The computing system 700 includes a processor 710, a memory 720, a storage device 730, and an input/output device 740. Each of the processor 710, the memory 720, the storage device 730, and the input/output device 740 are interconnected using a system bus 750. The processor 710 is capable of processing instructions for execution within the computing system 700.

In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the computing system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the computing system 700. In some implementations, the storage device 730 is a computer-readable medium. In various different implementations, the storage device 730 may be a floppy disk device, a hard disk device, an optical disk device, or a tape device.

The input/output device 740 provides input/output operations for the computing system 700. In some implementations, the input/output device 740 includes a keyboard and/or pointing device. In some implementations, the input/output device 740 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A method for automatic detection of network infrastructure, the method comprising:
   receiving, by a network sensor, a new network message, wherein the new network message comprises deserialized event data;
   determining whether the new network message is potentially malicious based on the presence of an indicator-of-compromise (IoC), wherein the determining comprises:
      decorating the deserialized event data by adding, to the deserialized event data, at least one of a timestamp, geo-location data, threat intelligence data, and a connection-identifier;
      retrieving a set of IoC rules for detecting one or more IoCs in the decorated event data;
      applying the set of IoC rules to the decorated event data; and
      identifying the decorated event data as including one or more IoCs based on application of the set of IoC rules and further decorating the deserialized event data with corresponding IoC information; and
   in response to determining that the new network message is potentially malicious, assigning a risk-label to the new network message based on associations with information from other network messages, wherein the identifying comprises:
      extracting, from the decorated event data, a source-address of the new network message;
      assembling a plurality of unique similar-addresses based on the source-address comprising:
         identifying one on or more source-metadata values associated with the source-address;
         searching a group of previous network messages for matching network messages to the new network message, based on the matching network messages having metadata of at least a threshold similarity to at least one of the source-metadata values with the source-address; and
         adding the matching network messages to the plurality of unique similar-addresses;
      generating metadata to associate with the source-address for the new message, wherein the metadata is generated by recursively assembling related metadata from each of the plurality of unique-similar addresses;
      assigning, using a plurality of factors, risk-labels to the source-address of the new network message and the plurality of unique similar-addresses based, at least in part, on the metadata associated with the source-address recursively assembled from the related metadata for the plurality of unique-similar addresses, wherein the risk-labels are selected from among a plurality of possible risk-labels, wherein the plurality of possible risk-labels include a safe-label indicating no unsafe behavior was found associated with the address and a tainted-label indicating the address was found to be associated with network architecture identified as malicious; and
      performing one or more network security actions based on the risk-labels.

2. The method of claim 1, wherein the metadata includes at least one of the group consisting of domain-name, nameserver, and registrant-email.

3. The method of claim 2, wherein the metadata includes each of domain-name, nameserver, and registrant-email.

4. The method of claim 1, wherein the plurality of factors includes a factor comprising a comparison between a number of domains associated with a registrant emails of each of the plurality of unique similar-addresses being greater than a first threshold value, wherein the number of domains being less than the first threshold value indicates a likelihood of unsafe behavior.

5. The method of claim 1, wherein the plurality of factors includes a factor comprising a determination that a registrant email of at least one of the plurality of unique similar-addresses was previously identified as tainted.

6. The method of claim 1, wherein the plurality of factors includes a factor comprising a comparison, for each of the plurality of unique-similar addresses, between 1) a number of domains registered with an organization owning the unique-similar address and 2) a number of domains registered by the unique-similar address, wherein an exact match between 1) and 2) indicates a likelihood of unsafe behavior being associated with the unique-similar address.

7. The method of claim 1, wherein the plurality of factors includes a factor comprising a comparison between a number of domains registered with an organization owning each of the plurality of unique-similar addresses and a second threshold value, wherein the number of domains being less than the second threshold value indicates a likelihood of unsafe behavior being associated with the unique-similar address.

8. The method of claim 1, wherein the plurality of factors includes a factor comprising a comparison between a number of websites hosted on a server that hosts a resource addressed by each of the plurality of unique-similar addresses and a third threshold value, wherein the number of websites hosted being less than the third threshold value indicates a likelihood of unsafe behavior being associated with the unique-similar address.

9. A system comprising:
   one or more hardware processors; and non-transitory computer memory tangibly containing instructions that, when executed by the processor, cause the processor to perform operations comprising:
receiving, by a network sensor, a new network message, wherein the new network message comprises deserialized event data;
determining whether the new network message is potentially malicious based on the presence of an indicator-of-compromise (IoC), wherein the determining comprises:
decorating the deserialized event data by adding, to the deserialized event data, at least one of a timestamp, geo-location data, threat intelligence data, and a connection-identifier;
retrieving a set of IoC rules for detecting one or more IoCs in the decorated event data;
applying the set of IoC rules to the decorated event data; and
identifying the decorated event data as including one or more IoCs based on application of the set of IoC rules and further decorating the deserialized event data with corresponding IoC information; and
in response to determining that the new network message is potentially malicious, assigning a risk-label to the new network message based on associations with information from other network messages, wherein the identifying comprises:
extracting, from the decorated event data, a source-address of the new network message;
assembling a plurality of unique similar-addresses based on the source-address comprising:
identifying one on or more source-metadata values associated with the source-address;
searching a group of previous network messages for matching network messages to the new network message, based on the matching network messages having metadata of at least a threshold similarity to at least one of the source-metadata values with the source-address; and
adding the matching network messages to the plurality of unique similar-addresses;
generating metadata to associate with the source-address for the new message, wherein the metadata is generated by recursively assembling related metadata from each of the plurality of unique-similar addresses;
assigning, using a plurality of factors, risk-labels to the source-address of the new network message and the plurality of unique similar-addresses based, at least in part, on the metadata associated with the source-address recursively assembled from the related metadata for the plurality of unique-similar addresses, wherein the risk-labels are selected from among a plurality of possible risk-labels, wherein the plurality of possible risk-labels include a safe-label indicating no unsafe behavior was found associated with the address and a tainted-label indicating the address was found to be associated with network architecture identified as malicious; and
performing one or more network security actions based on the risk-labels.

10. The system of claim 9, wherein the metadata includes at least one of the group consisting of domain-name, nameserver, and registrant-email.

11. The system of claim 10, wherein the metadata includes each of domain-name, nameserver, and registrant-email.

12. The system of claim 9, wherein the plurality of factors includes a factor comprising a comparison between a number of domains associated with a registrant emails of each of the plurality of unique similar-addresses being greater than a first threshold value, wherein the number of domains being less than the first threshold value indicates a likelihood of unsafe behavior.

13. The system of claim 9, wherein the plurality of factors includes a factor comprising a determination that a registrant email of at least one of the plurality of unique similar-addresses was previously identified as tainted.

14. The system of claim 9, wherein the plurality of factors includes a factor comprising a comparison, for each of the plurality of unique-similar addresses, between 1) a number of domains registered with an organization owning the unique-similar address and 2) a number of domains registered by the unique-similar address, wherein an exact match between 1) and 2) indicates a likelihood of unsafe behavior being associated with the unique-similar address.

15. The system of claim 9, wherein the plurality of factors includes a factor comprising a comparison between a number of domains registered with an organization owning each of the plurality of unique-similar addresses and a second threshold value, wherein the number of domains being less than the second threshold value indicates a likelihood of unsafe behavior being associated with the unique-similar address.

16. The system of claim 9, wherein the plurality of factors includes a factor comprising a comparison between a number of websites hosted on a server that hosts a resource addressed by each of the plurality of unique-similar addresses and a third threshold value, wherein the number of websites hosted being less than the third threshold value indicates a likelihood of unsafe behavior being associated with the unique-similar address.

17. The method of claim 1, wherein applying the set of IoC rules to the decorated event data comprises determining whether the new network message matches any known malicious indicator in a list of known malicious indicators, the list comprising at least one of (i) hashes of known malicious files and (ii) IP addresses of endpoints in network communications.

18. The method of claim 1, wherein performing one or more network security actions based on the risk-labels comprises:
adding at least one of the plurality of unique-similar addresses to a blacklist of network infrastructure that has been identified as malicious or likely malicious;
adding the blacklist to the set of IoC rules; and
determining whether another new network message is potentially malicious based at least in part on applying the set of IoC rules comprising the blacklist to event data of the another new network message.

* * * * *